United States Patent [19]

Sollich

[11] 4,335,147
[45] Jun. 15, 1982

[54] METHOD FOR MAKING CONFECTIONS

[76] Inventor: Helmut Sollich, Albernberg 194, 4925 Kalletal-Talle, Fed. Rep. of Germany

[21] Appl. No.: 129,672

[22] Filed: Mar. 12, 1980

[51] Int. Cl.³ .............................................. A23G 3/00
[52] U.S. Cl. .................................... 426/295; 426/660
[58] Field of Search ............... 426/89, 93, 103, 104, 426/289, 389, 512, 515, 414, 660, 295; 264/300, 325, 299, 308; 425/110, 436 R

[56] References Cited

U.S. PATENT DOCUMENTS

| 1,640,052 | 8/1927 | Olsen | 426/124 |
| 3,463,641 | 8/1969 | Berardi et al. | 426/512 |
| 3,733,159 | 5/1973 | Coffman | 264/325 |
| 4,010,284 | 3/1977 | Bellew | 426/660 |
| 4,225,627 | 9/1980 | Moore | 426/660 |

FOREIGN PATENT DOCUMENTS 2421283 11/1974 Fed. Rep. of Germany ........ 426/93

Primary Examiner—Hiram Bernstein
Attorney, Agent, or Firm—Max Fogiel

[57] ABSTRACT

A method and an apparatus for making confections of substantially uniform size are disclosed. A gob of flowable confectionary substance is deposited onto a surface and then submitted to pressure so as to make it spread into contact with an inner circumferential surface of a surrounding annular mold. The mold is then chilled so as to chill the gob and make it solidify and the resulting confectionary body is removed from the mold.

7 Claims, 8 Drawing Figures

METHOD FOR MAKING CONFECTIONS

BACKGROUND OF THE INVENTION

This invention relates to the making of confections, such as chocolates and the like.

More particularly, the invention relates to a method of and an apparatus for making such confections of substantially uniform size.

Confections, generically known as "chocolates", may be made of various types of materials, for example of caramel, of chocolate, of cream, of mixtures of the same or of other materials. Very often, other substances, such as sliced or grated nuts, almonds, or the like, are put onto a drop or gob of the confectionary substance, to adhere to the same. After the substance sets and rigidifies it may be coated with chocolate or the like. Due to the manner of manufacture of these confections, they are usually of totally non-uniform shape and size. This is highly disadvantageous if they are to be accommodated in a package, especially in a package having compartments intended to each accommodate one of the confections, because for some confections the compartment may be too large and for others it may be too small.

SUMMARY OF THE INVENTION

Accordingly, it is an object of the present invention to avoid the disadvantages of the prior art.

A more particular object is to provide an improved method of making confections of substantially uniform size, i.e. of making confections which are substantially identical in weight and shape and volume, so that the subsequent packaging of these confections is greatly simplified and, in fact, in many instances made possible for the first time.

A concomitant object of the invention is to provide an apparatus for carrying out the method.

Pursuant to the above objects, and to others which will become apparent hereafter, one feature of the invention resides in a method of making confections of substantially uniform size. Briefly stated, this method may comprise the steps of depositing a gob of flowable confectionary substance onto a surface; surrounding the gob in spaced relationship with an annular mold; exerting pressure upon the gob to cause it to spread apart into contact with the mold; causing the gob to set so as to form a confectionary body in the mold; and separating the confectionary body and the mold from one another.

Before the gob is caused to set, or even before pressure is exerted upon it, pieces of nuts, almonds, raisins, toasted flakes or the like are applied on the gob. The mold may be placed onto the surface either before or after the gob has been deposited on the surface and the step of causing the gob to set is carried out only after the pressing has taken place so that the deposited pieces of nut or the like are first pushed into the gob and firmly retained by the material of the same. The confectionary material may, of course, be a chocolate mass, a sugar mass, a crokant mass or the like.

An apparatus for carrying out the method may comprise means having a support surface; means for depositing gobs of flowable confectionary substance onto the surface; annular mold means supportable on the surface and adapted to surround the respective gob with clearance; means for exerting pressure onto the gob to cause the same to spread outwardly into contact with the mold means and form a confectionary body therein; and means for removing the confectionary body from the mold means.

It goes without saying that two or more molds may be used at the same time, i.e. mounted on or in a common carrier. It is also possible to use two or more means for depositing gobs of flowable confectionary substance, each associated with one of the annular molds. It is advantageous if each of the molds is hollow in its circumferential wall and if a cooling fluid circulates through this hollow so as to obtain a rapid chilling (and thus setting) of the gob.

Removal of the confectionary body from the mold is facilitated if the inner circumferential surface of each mold, i.e. the surface coming in contact with the gob, is clad with a friction-reducing material, such as polytetrafluoroethylene or the like to which the confectionary substance does not adhere.

The invention will hereafter be described with reference to exemplary embodiments of an apparatus for carrying out the method. However, this is only for purposes of explanation and the scope of protection sought is defined exclusively in the appended claims.

DESCRIPTION OF PREFERRED EMBODIMENTS

Figure 1:
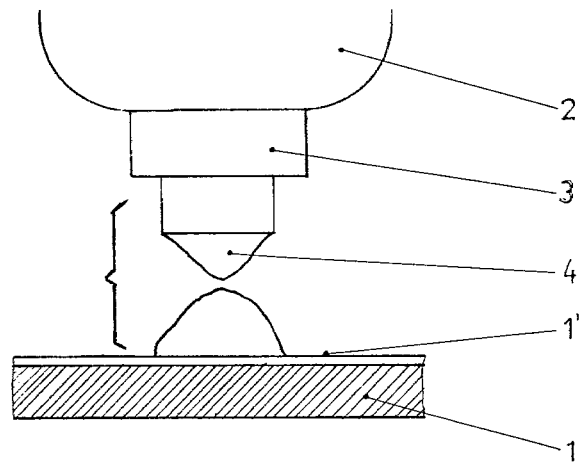
FIGS. 1-5 are all vertical sections, illustrating different steps in the operation of an apparatus according to the invention.
Figure 2:
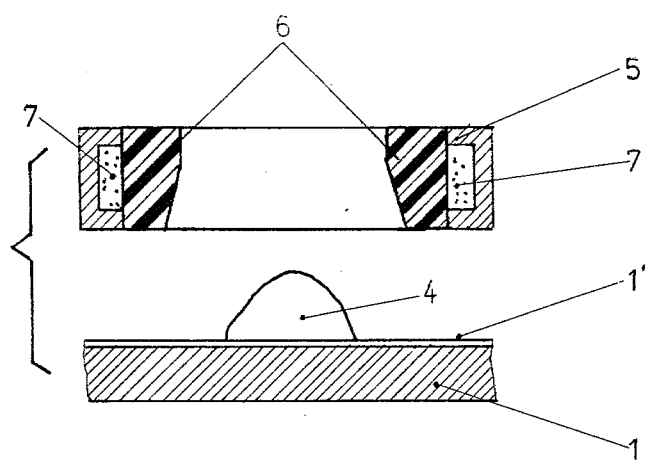

Referring now to the drawing, and firstly to the embodiment illustrated in FIGS. 1-5, it will be seen that reference numeral 1 identifies a work table which may or may not be covered with a thin removable cover layer 1'. Above the table 1, which is illustrated only fragmentarily, there is provided a diagrammatically shown dispensing or dosing device 2 which dispenses flowable confectionary substance (e.g. on chocolate bases, on sugar bases, or the like), such as caramel. The device 2 has a nozzle 3 which dispenses a gob 4 of the flowable confectionary substance (the size of each gob can be adjusted by adjusting the nozzle in known manner which forms no part of the invention) and deposits it as a drop or gob onto the table 1, 1'. This is illustrated in FIG. 1. The cover 1' is then moved along the surface of the table 1 until it reaches the position 2 in which it is located beneath an annular mold 5 which is now lowered onto the cover 1' so that it surrounds the gob 4 with annular spacing. The inner circumferential surface of the mold 5 is provided with a coating 6, for example of polytetrafluoroethylene or the like and its circumferential wall is formed with a channel 7 through which a cooling fluid is circulated to chill the mold 5.

The space bounded by the inner circumference of the mold, or rather by the inner circumference of the coating 6, may have any desired regular or irregular shape, depending upon what shape it is desired to impose upon the finished confectionary body. What is important is that all successive confectionary bodies will always have the same shape, it is also important that the mold surround the gob 4 with relatively substantial clearance.

Figure 3:
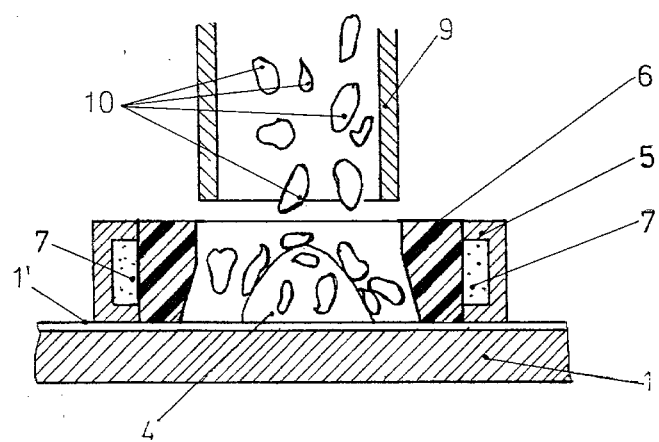

Once the position shown in FIG. 3 has been reached, in which the mold rests on the cover 1', a tube or similar conveyor 9 is used to drop onto it various pieces 10 of nuts, raisins or the like. Since the material of the gob is sticky (not having been set as yet) these pieces 10 will adhere to it.

The cover 1' and mold 5 with the surrounded gob 4 are now moved to another station at which a ram 8 is lowered from above so as to press against the gob, causing the gob to spread out into contact with the inner circumferential surface of the coating 6 and pressing the pieces 10 into the material of the gob. The gob now has a shape corresponding to the shape of the space bounded by the mold 5, 6 and since this will be true of all gobs manufactured with the aid of the mold 5, 6, such gobs can subsequently readily be packaged.

Figure 4:
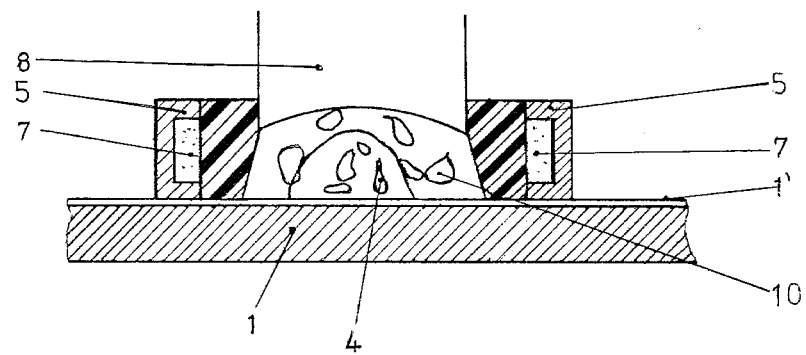
Figure 5:
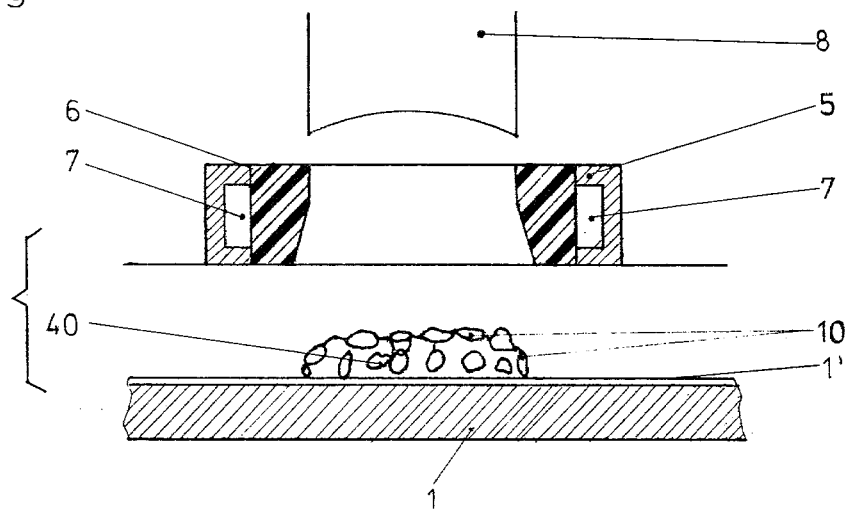

During the application of pressure by the ram 8, or at least immediately subsequent thereto, a cooling fluid is circulated through the channel 7 in order to quickly chill the material of the gob to produce a confectionary body 40. As soon as the chilling has taken place the mold 5 may be lifted off as shown in FIG. 5; although in FIG. 5 the ram 8 is also shown as being lifted it should be understood that the lifting of the mold 5 can be effected while the ram 8 is still within the mold 5, for example as shown in FIG. 4.

In any case, the confectionary 40 is expelled from the mold 5, and this is facilitated by the presence of the lining or cladding 6 to which the material of the gob does not adhere.

Figure 6:
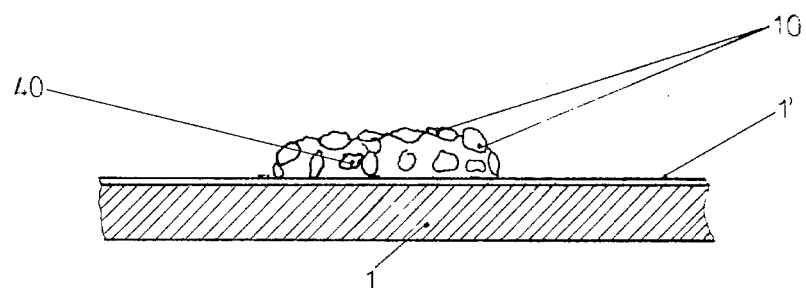
FIG. 6 is a partly sectioned elevation, showing the finished confectionary body resting on a support surface.

The finished confectionary body 40 remains on the cover 1' as shown in FIG. 6 and can now be moved from there to another device (known per se) where it may be coated with chocolate or any other desired edible coating. It will be readily appreciated that all of the confectionary bodies 40 thus produced will have the same shape, size and volumetric content and can be readily packaged in standard packages.

It will also be appreciated that devices for raisins and lowering the dispenser 2, the mold 5, the dispenser 9 and the ram 8 are known per se and therefore require no detailed discussion.

Figure 7:
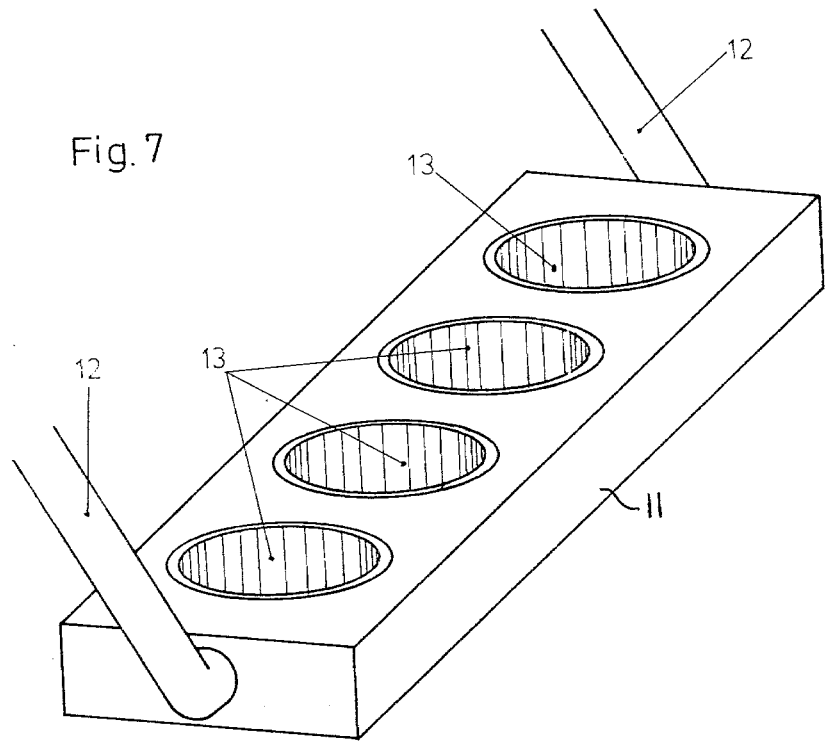
FIG. 7 is a perspective view of a carrier provided with a plurality of annular molds.
Figure 8:
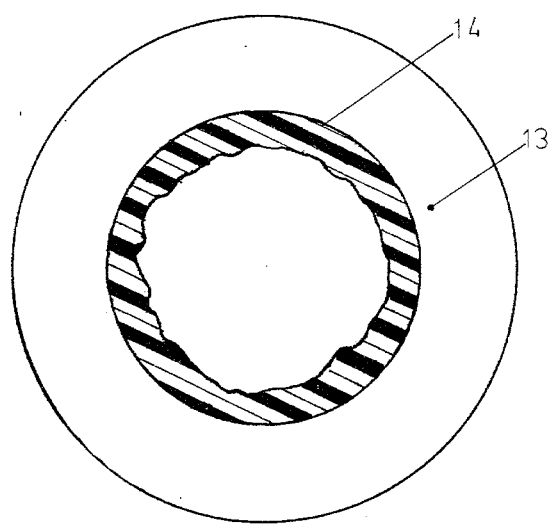
FIG. 8 is a top-plan view, partly in horizontal section, illustrating an annular mold on an enlarged scale.

FIG. 7 shows an embodiment in which a carrier 11 (which is hollow in its interior) carries 4 (there could be more or fewer) of the annular molds 13 which may be identical or different from one another. One of these molds 13 is shown on an enlarged scale in FIG. 8 and it will be seen that its inner circumference is lined with a lining 14 of polytetrafluoroethylene or the like and that it may have a non-uniform inner circumference if it is desired for the confectionary bodies to have a non-smooth surface. The annular molds 13 are mounted in the carrier 11 (and there may be a corresponding number of dispensing devices 2 each cooperating with one of the molds 13) and inlet and outlet pipes 12 communicate with the carrier so as to permit the circulation therethrough of a cooling fluid for example freon gas, to flow about and chill the carriers 13.

It goes without saying that just as a number of dispensers 2 may be provided corresponding to the number of annular molds 13, a similar number of rams and dispensers 9 may be provided.

The invention has been set forth herein with reference to exemplary embodiments. However, it is subject to various modifications and all such modifications are intended to be encompassed within the range and scope of the appended claims.

What is claimed is:

1. A method of making confections of substantially uniform size, comprising the steps of depositing a gob of flowable confectionary substance onto a surface; surrounding the gob in spaced relationship with an annular mold, said mold surrounding said gob only around the periphery of said gob, said mold surrounding said gob with clearance therebetween; depositing at least one additive loosely on the gob; exerting pressure upon the gob to cause it to spread apart within the borders of the mold so that a gap is left between the spread gob and the mold, pressure being also exerted on the additives to press said additives into said gob; causing the gob to set so as to form a confectionary body in the mold; and separating the confectionary body and the mold from one another, the shape of the confectionary body being substantially independent of the shape of said annular mold.

2. A method as defined in claim 1, wherein said additive is selected from the group consisting of nuts, raisins, toasted flakes and cronkant pieces.

3. A method as defined in claim 1, the step of surrounding comprising placing the annular mold onto said surface.

4. A method as defined in claim 1, wherein the step of surrounding comprises placing the annular mold onto said surface and is carried out prior to the step of depositing.

5. A method as defined in claim 1, wherein the step of causing the gob to set comprises chilling the gob.

6. A method as defined in claim 1, wherein the step of causing the gob to set comprises exposing the gob to deep freeze temperatures.

7. A method as defined in claim 1, wherein said additive is selected from the group consisting of nuts, raisins, toasted flakes and crokant pieces; said set of surroundings comprising placing the annular mold onto said surface; said step of causing the gob to set comprising chilling the gob; said mold having a circumferential wall provided with at least one cooling channel for circulating a cooling fluid through said channel, said mold having an inner circumferential surface provided with anti-friction material so as to at least reduce adhering of confectionary material thereto.

* * * * *